United States Patent [19]

Fukuda

[11] Patent Number: 4,977,463

[45] Date of Patent: Dec. 11, 1990

[54] IMAGE RECORDING APPARATUS FOR MINIMIZING AN OUTPUT SIZE OF PAPER HAVING MARKED AN AREA OF AN INPUT IMAGE

[75] Inventor: Shigeru Fukuda, Yokohama, Japan

[73] Assignee: Ricoh Company, Ltd., Tokyo, Japan

[21] Appl. No.: 352,407

[22] Filed: May 16, 1989

[30] Foreign Application Priority Data

May 16, 1988 [JP] Japan .................................. 63-117030

[51] Int. Cl.⁵ .............................................. H04N 1/40
[52] U.S. Cl. .................................. 358/448; 358/449; 358/400; 358/296; 358/474
[58] Field of Search ............... 358/474, 400, 401, 482, 358/481, 75, 448, 449, 486, 488, 494, 296, 497

[56] References Cited

U.S. PATENT DOCUMENTS 4,819,078 4/1989 Tadokoro et al. .................. 358/400

FOREIGN PATENT DOCUMENTS 0201370 12/1982 Japan .
0009464 1/1983 Japan .

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

An image recorder having an image editing function for recording on a paper only a part of image information which lies is a marked area of a document by digitally reading the image information. The marked part of image information on the document is recorded on a paper having a particular size which adequately matches the marked part with respect to the dimensions.

6 Claims, 12 Drawing Sheets

Fig.10A
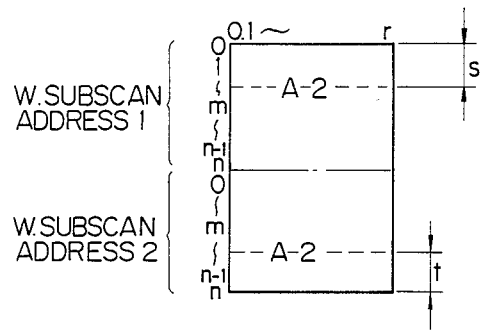
Fig.10B   Fig.10C   Fig.10D
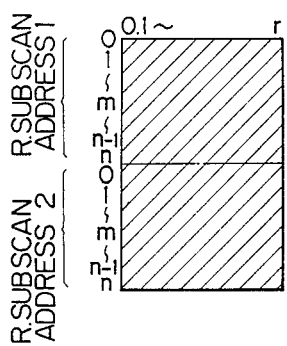 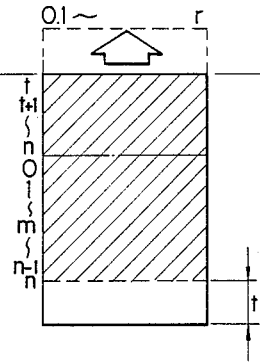 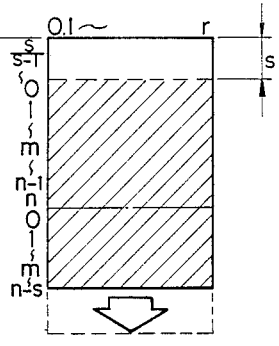
Fig.10E   Fig.10F
 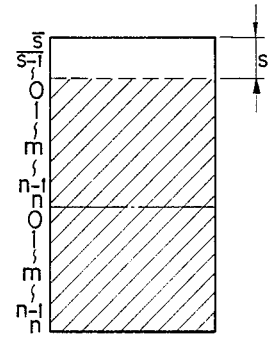

IMAGE RECORDING APPARATUS FOR MINIMIZING AN OUTPUT SIZE OF PAPER HAVING MARKED AN AREA OF AN INPUT IMAGE

BACKGROUND OF THE INVENTION

The present invention relates to an image recorder having a function of digitally reading image information printed on a document and recording only a marked portion of the image information on a paper.

Many of modern digital copiers or similar image recorders have a function for allowing a person to mark a desired portion of image information printed on a document and recording only the marked portion on a paper, i.e. an image editing function. The current trend in the art is toward the diversification of the image editing function. For example, in a digital copier with an image editing capability and having a page memory, a desired portion of image information carried on a document is marked and then shifted or otherwise edited, and then the edited image fragment is recorded on a paper in the form of a cut sheet of a regular size or a roll having at least a predetermined width. Hence, even when the marked area of a document to be recorded is extremely small, the size of a paper to reproduce the marked area thereon remains the same. More specifically, in the case of image recording which is not aided by magnification change processing, a document and a paper are usually of the same size or area and, therefore, an image portion marked on the document is of course smaller than the paper with respect to the area. This wastefully leaves a substantial area of a paper or recording simply blank. Such a problem is especially pronounced when use is made of a document and a paper each having a large size.

SUMMARY OF THE INVENTION

It is therefore an object of the present invention to provide an image recorder having an image editing capability which eliminates the wasteful use of paper.

It is another object of the present invention to provide a generally improved image recorder having an image editing function.

An image recorder having an image editing function for recording on a paper only a marked area of image information which is printed on a document of the present invention comprises a reading section for reading the image information on the document, a storing section for sequentially writing the read image information therein in the form of video data, a recording section for reproducing the stored video data on a paper by reading the video data out of the storing section, an inputting section for marking a particular area of the image information to be recorded on the paper, and a control section for controlling the reading section, storing section, recording section and inputting section such that the image information in the marked area of the document is recorded on a paper having a length which is associated with the marked area.

BRIEF DESCRIPTION OF THE DRAWINGS

The above and other objects, features and advantages of the present invention will become more apparent from the following detailed description taken with the accompanying drawings in which:

FIGS. 10A to 10F are diagrams useful for understanding how an image may be formed on a paper;

DESCRIPTION OF THE PREFERRED EMBODIMENT

Figure 1:
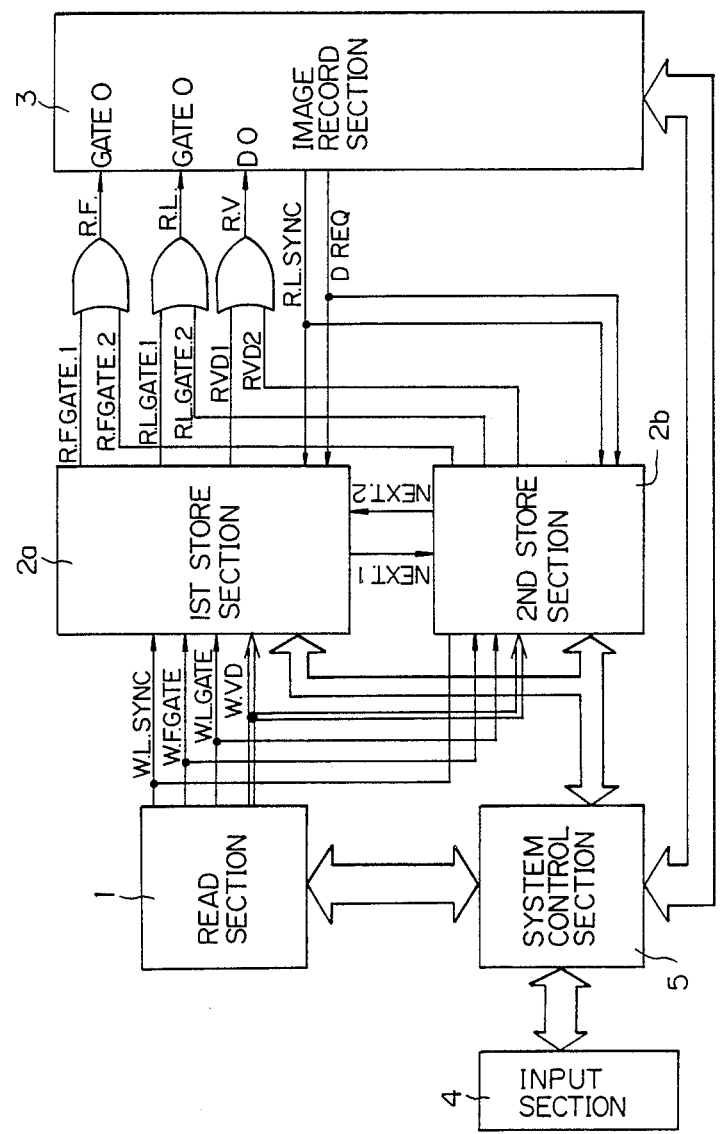
FIG. 1 is a schematic block diagram showing an image recorder embodying the present invention.

Referring to FIG. 1 of the drawings, an image recorder embodying the present invention is shown in a schematic block diagram. As shown, the image recorder includes a reading section 1 for reading image information printed on a document, a first and a second storing section 2a and 2b for storing image information read by the reading section 1 in the form of video data and which are identical in construction, and an image recording section 3 for reading video data out of the storing sections 2a and 2b to record them on a paper. The image recorder further includes an inputting section 4 accessible for entering various image recording conditions, and a system control section 5 for delivering necessary information to the reading section 1, storing sections 2a and 2b and image recording section 3 in response to the information entered on the inputting section 4 while monitoring and controlling various conditions.

Figure 2:
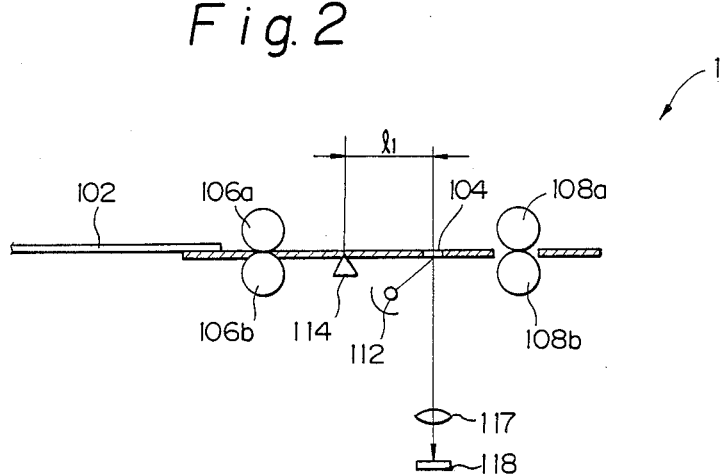
FIG. 2 is a front view schematically showing a reading section.
Figure 3:
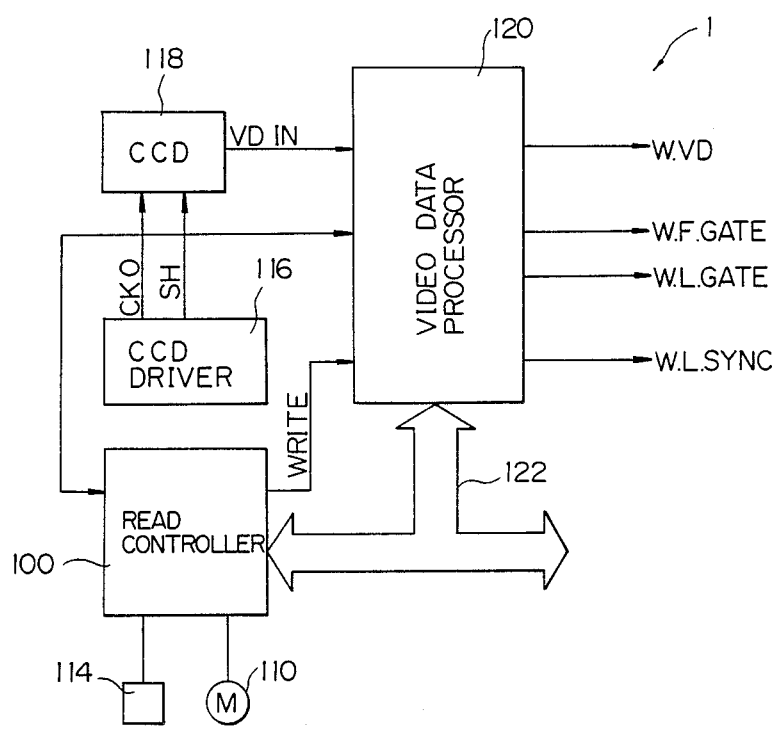
FIG. 3 is a schematic block diagram of a control system associated with the reading section.

FIG. 2 shows a specific construction of the reading section 1, while FIG. 3 shows a control system associated with the reading section 1 of FIG. 2. In the figures, the reading section 1 has a pair of rollers 106a and 106b for driving a document 102 toward a slit 104 for imagewise exposure, and a pair of rollers 108a and 108b for driving the document 102 away from the slit 104. These rollers 106a, 106b, 108a and 108b are driven by a motor 110. A light source 112 is provided for illuminating the document 102. A sensor 114 is responsive to the insertion and passage of the document 102. A read controller 100 monitors and controls the motor 110, light source 112, sensor 114, etc. A reflection from the document 102 is focused by a lens 117 onto a photoelectric converter 118 which is implemented as a CCD (Charge Coupled Device) array. A CCD driver 116 generates a clock CK0 for driving the CCD array 118 and pulses SH for initializing the CCD array 18. A video processor 120 receives video data VDin from the CCD array 118 and, in response to information 122 fed from the system control section 6, applies binarization, halftone processing, magnification change processing and the like to the video data VDin.

Figure 4:
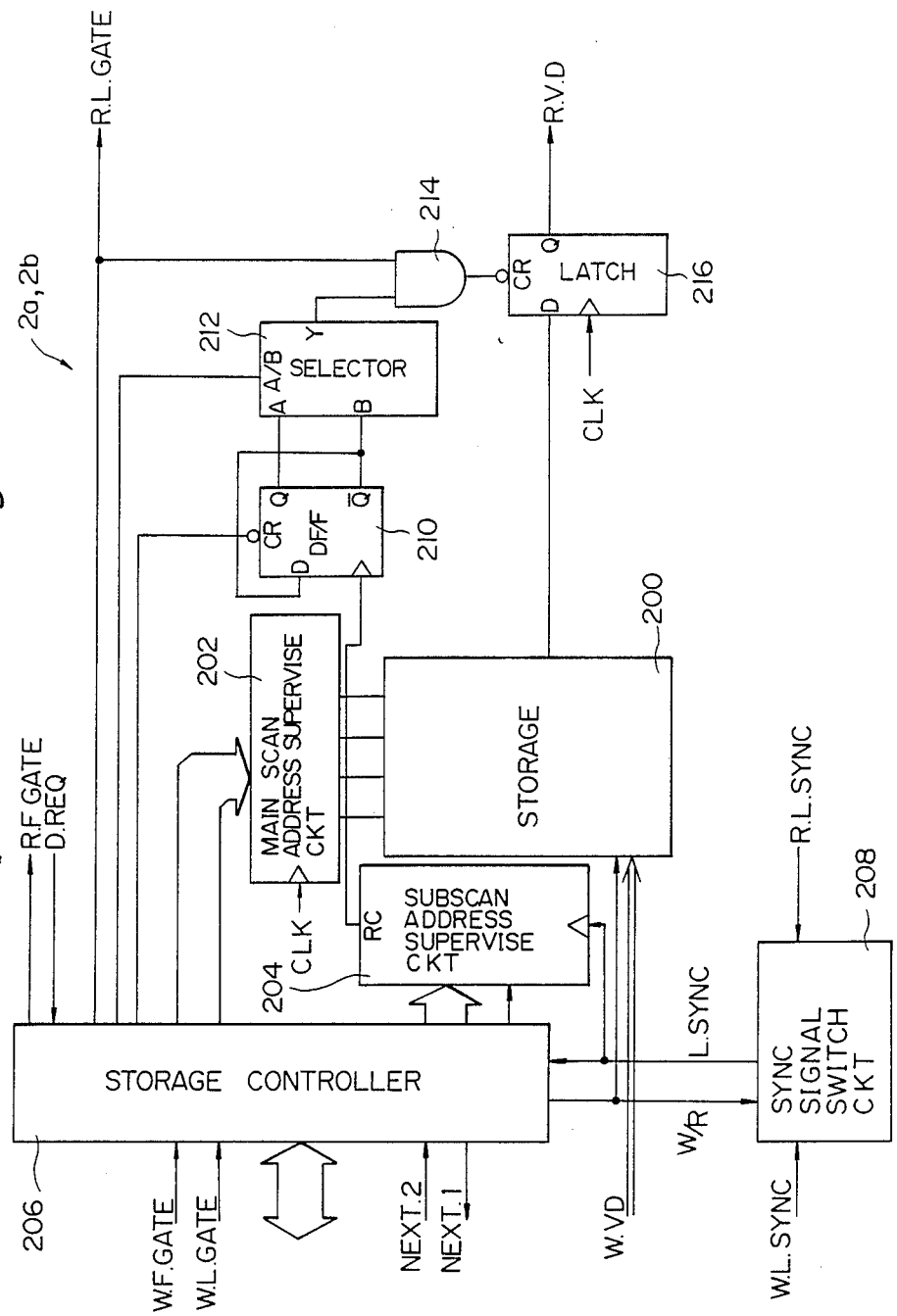
FIG. 4 is a schematic block diagram of a storing section.

Referring to FIG. 4, a specific construction of the storing section 2a or 2b is shown. As shown, the storing section 2a or 2b has a main scanning address supervising circuit 202 for supervising the addresses in the main scanning direction by counting a clock CLK which appears on a pixel basis, and a subscanning address supervising circuit 204 for supervising the addresses in the subscanning direction by counting synchronizing signals L. Sync being outputted by the reading section 1 or the image recording section 3. These supervising circuits 202 and 204 in combination govern a bit-map type storage 200 with respect to the address. A storage controller 206 controls the write-in and read-out of video data from the storage 200 while switching over the synchronizing signals, in response to signals W.F. Gate (write enable signals) from the reading section 1 and image recording section 3, read request signals D. Req from the storing section 2a or 2b, and commands from the system control section 5. A switching circuit 208 switches over the synchronizing signals. A delay flip-flop 210 is initialized by the storage controller 206 after the arrival of a read request signal D Req from the image recording section 3 and before the start of readout. When the value of the subscanning address supervising section 204 coincides with a predetermined value, a pulse signal is applied to the delay flip-flop 210 to invert its output. A selector 212 receives outputs Q and $\overline{Q}$ of the delay flip-flop 210 and selects one of them in response to a command fed from the system control section 5 which is associated with information entered on the inputting section 4, and on the basis of a signal outputted by the storage controller 206. An AND gate 214 ANDs the output of the selector 212 and a line synchronizing signal R. L. Gate associated with horizontal scanning. The output of the AND gate 214 is connected to a latch 216 which latches and outputs an video signal from the storage 200 in response to a video data transfer clock CLK. Hence, video data R. V. D. is fed out from the latch 216 only when both inputs to the AND gate 214 have a high level. Each of the main and subscanning address supervising circuits 202 and 204 is implemented as a ring counter which counts up input pulses and, upon reaching a predetermined value, returns to zero.

Figure 5:
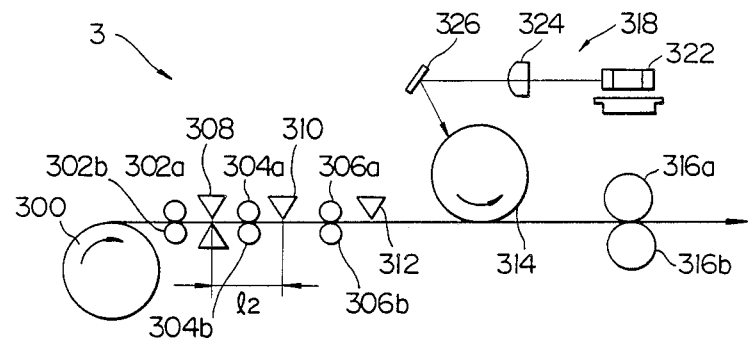
FIG. 5 is a front view schematically showing an image recording section.
Figure 6:
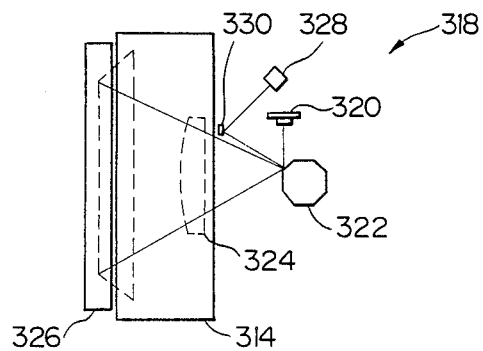
FIG. 6 is a plan view of optics for focusing imagewise light onto a photoconductive element.

Referring to FIG. 5, a specific construction of the image recording section 3 is shown. As shown, the image recording section 3 has roller pairs 302a and 303b, 304a and 304b and 306a and 306b for paying out a paper from a roll 300, a cutter 308 for cutting the paper 300, sensors 310 and 312 responsive to the paper 300, a photoconductive element 314, a fixing roller pair 316a and 316b, and optics 318 for imagewise exposure. As shown in FIG. 6, the optics 318 is made up of a semiconductor laser 320, a rotary scanning body 322 for causing a laser beam issuing from the laser 320 to scan the photoconductive element 314, an f-theta lens 324, a mirror 326, a sensor 328 for sensing the position of the scanning beam, and a mirror 330 for steering the beam toward the sensor 328.

Figure 7:
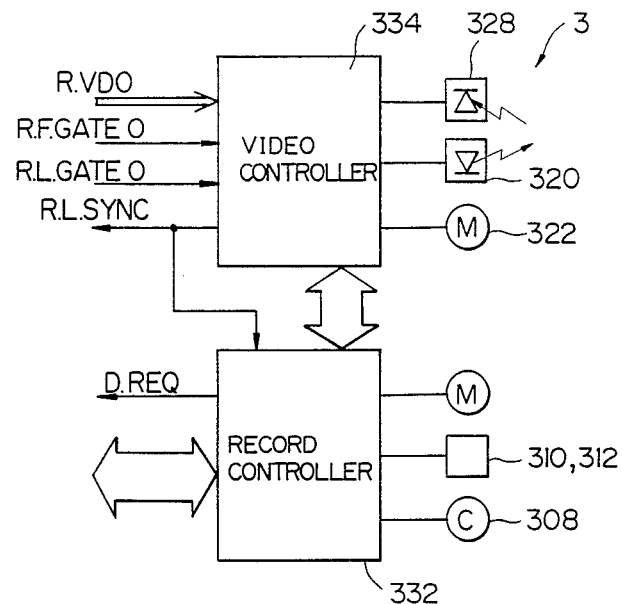
FIG. 7 is a schematic block diagram of a control system associated with the image recording section.

FIG. 7 shows a control system associated with the image recording section 3. The control system is shown as including a record controller 332 for controlling the transport and cutting of the paper 300, a charger and a discharger adapted for image development, a heater adapted for fixing, and so forth (not shown), while interchanging information with the system control section 5. A video controller 334 controls the rotation of the rotary scanning body 328 and delivers to the storing sections 2a and 2b a synchronizing signal which is synchronous to the output of the beam position sensor 328. The video controller 334 modulates the semiconductor laser 320 in response to a video signal R. VD0 and gate signals R. F. Gate 0 and R. L. Gate 0, so that the scanning body 322 scans the photoconductive element 314 to form a latent image thereon.

Figure 8:
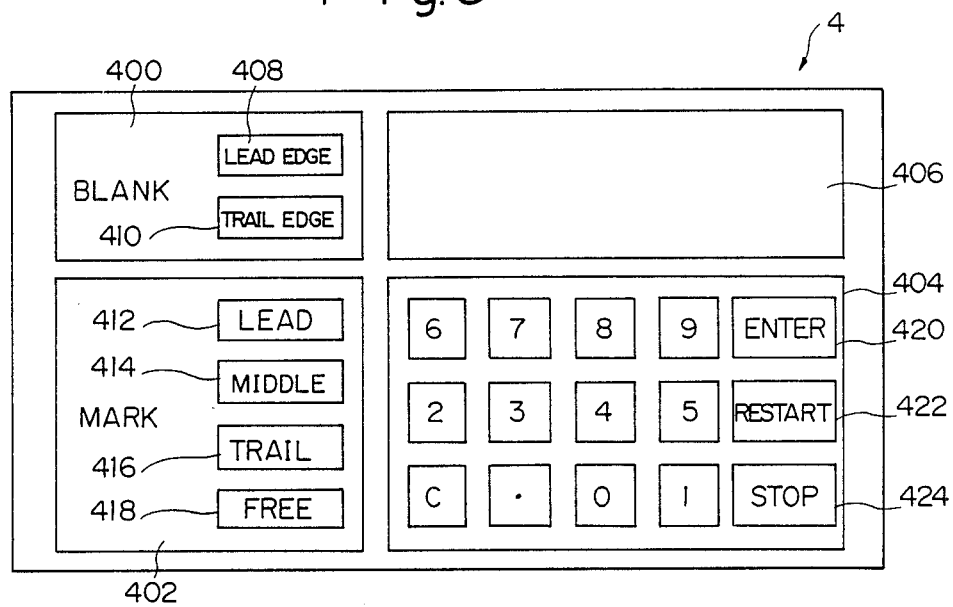
FIG. 8 is a view showing a specific arrangement of an inputting section.
Figure 9A:
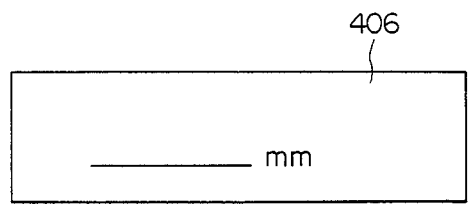
FIGS. 9A to 9E are diagrams each showing a specific format which appears on a displaying section.
Figure 9B:
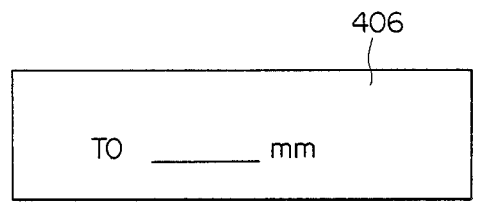
Figure 9C:
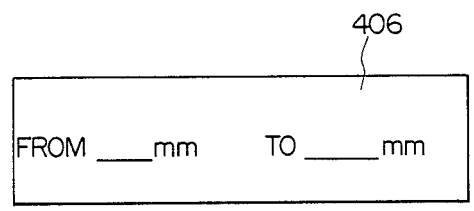
Figure 9D:
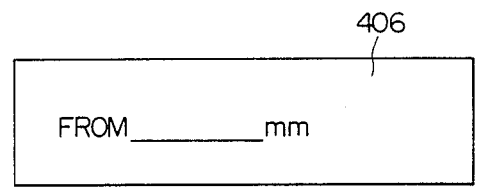
Figure 9E:
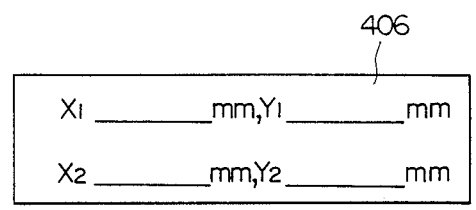

Referring to FIG. 8, a specific arrangement of the inputting section 4 is shown. As shown, the inputting section 4 is made up of a blank forming portion 400 accessible for forming a blank, a marking portion 402 for marking a desired area of a document image to extract it, a numeral key portion 404, and a display portion 406. The blank forming portion 400 has a key 408 for leaving a leading edge portion of a paper blank, and a key 410 for leaving a trailing edge portion of a paper blank. When the key 408 or 410 is pressed, the display portion 406 provides information in a format shown in FIG. 9A and awaits the entry of a numerical value on the numeral keys 404. In this condition, one may manipulate the numeral keys 404 to enter a desired length of a blank. The marking portion 402 has a key 412 for marking a leading area of a document image, a key 414 for marking an intermediate area of a document image, a key 416 for marking a trailing area of a document image, and a key 418 available for marking a particular area of a document image by specifying any desired points as measured in the longitudinal and lateral directions. The information appearing on the display portion 406 in association with the keys 412, 414, 416 and 418 are shown in FIGS. 9B, 9C, 9D and 9E, respectively. In any case, the display section 406 waits in the illustrated state until one enters a marking area on the numeral keys 404. It is to be noted that an entered numerical value is set when an enter key 420 is pressed, and the X and Y coordinates (0,0) for marking are defined at the left end of the leading edge of an original document. Further included in the numeral key portion 404 are a stop key 422 and a restart key 424.

The operation of the image recorder having the above construction will be described with reference to FIGS. 10A to 10F and 11A and 11B.

Assume that the storage 200 of each of the storing sections 2a and 2b has a bit map arrangement which satisfies, in the main scanning direction, the maximum recording width of the image recording section 3 and, in the subscanning direction, satisfies the lateral dimension of a paper of regular size with regard to the maximum recording width. For example, assuming that the maximum recording width of the image recording section 3 is 594 millimeters, the storage 200 is capable of accommodating video data associated with the lateral feed of a paper of format A2. The storages 200 of the storing sections 2a and 2b are joined together to store video data associated with the longitudinal feed of a paper of format A1 at maximum. The following description will concentrate on a case wherein a document of format A1 is fed longitudinally to reproduce its image in substantially the same position on a paper sheet having substantially the same length as the document by way of example.

When a document 102 is inserted into the reading section 1 as shown in FIG. 2, it is fed by the feed roller pair 106a and 106b toward the slit 104. As the sensor 114 senses the document 102, the read controller 100 responsive to an output of the sensor 114 counts the time which the document 102 needs to move from the sensor 114 to the slit 104 and then, as shown in FIG. 3, produces a read start signal WRITE. In response, the video data processor 120 sequentially receives video data associated with the main scanning direction of the CCD array 118 in synchronism with the CCD initializing signals SH being produced by the CCD driver 116. The video data processor 120 processes the video data on the basis of the synchronizing signal W. L. Sync, gate signal W. L. Gate associated with the video data in the main scanning direction, read start signal W. F. Gate, and input signal from the inputting section 4, thereby sequentially producing processed image data W. VD. Let it be assumed that the light source 112 has already been turned on and a reflection from the document 102 has been focused by the lens 117. Since the document 102 is continuously transported by the roller pairs 106a and 106b and 108a and 108b over the slit 104, the video data processor 120 sequentially receives, processes and outputs the video data of the main scanning direction of the document 102 at the timing cycles of the CCD driver 116. On receiving the output signal of the sensor 114, the read controller 100 starts counting the CCD initializing signals (synchronizing signals) SH being outputted by the CCD driver 116.

While which of the two storing sections 2a and 2b is to start writing video data first and which of them is to start reading the video data first may be specified at the system initializing stage, it is assumed herein that the storing section 2b starts reading and writing video data after the storing section 2a. On receiving a read start signal W. F. Gate from the reading section 1, the storage controller 204 (FIG. 4) of the storing section 2a initializes the main and subscanning address supervising sections 202 and 204, i.e., sets them to a (logical) ZERO at the positive-going edge of the signal W. F. Gate. The storage controller 204 produces a W/R signal for connecting the synchronizing signal switching circuit 208 to the synchronizing signal W. L. Sync which is fed from the reading section 1, whereby the storage 200 is conditioned for a write mode. Thereafter, at the positive-going edge of the gate signal W. L. Gate, the storage controller 204 causes the main scanning address supervising section 202 to start its address up-counting operation. The storage 200 therefore continuously writes video data W. VD from the main scanning address #0 of the subscanning address #0 until the gate signal W. L. Gate falls and until the address supervising circuit 202 counts up the addresses up to #r. In response to a synchronizing signal W. L. Sync, the subscanning address supervising circuit 204 increments the address, while the main scanning address supervising circuit 202 is initialized to a ZERO. In the same manner, as the gate signal W. L. Gate rises again, the main scanning address supervising section 202 sequentially increments the address so that the video data W. VD are written in the main scanning addresses #0 to #r of the subscanning address #1.

The above sequence of steps is repeated until, assuming that FIG. 10A is representative of the document of format A2, the subscanning address supervising circuit 204 reaches the address #n (W. subscanning address #1, FIG. 10A). Then, in response to a synchronizing signal W.L. Sync, the main scanning address supervising circuit 204 is again initialized to a ZERO while a signal NEXT. 1 showing that the storage 200 of the first storing section 2a is full is fed out. In the following description, the components of the second storing section 2b will be designated by adding a suffix b to the labels of the components shown in FIG. 4.

In response to the signal NEXT 1, the second storing section 2b initializes the subscanning address supervising circuit 204b, i.e., sets it to the address #0 and prepares for the writing of video data in its own storage 200b on the basis of the cycle of the next synchronizing signal. As the gate signal W.L. Gate rises after the synchronizing signal W.L. Sync, the first storing section 2a sequentially writes the video data W. VD in the main scanning addresses #0 to #r of the last subscanning address #n of the storage 200 and then ends the writing operation. On the other hand, the second storing section 2b responds to the subsequent synchronizing signal W.L. Sync by initializing its main scanning address supervising circuit 202b, sequentially writes the video data W. VD in the main scanning addresses #0 to #r while the gate signal W.L. Gate has a high level, and causes the subscanning address supervising circuit 204b to increment the address in response to the next synchronizing signal W.L. Sync. Such a procedure is repeated thereafter.

In the meantime, the image recording section 3 has started rotating the motor 110 and thereby the roller pairs 302a and 302b, 304a and 304b and 306a and 306b as well as the photoconductive element 314 and fixing roller pair 316a and 316b, at the instant when the subscanning address of the storing section 2b reaches #m. This is to start paying out the paper 300 from the roll at such a timing that the leading edge of the paper 300 reaches the register sensor 312 which is located at the same distance from an image transfer station where the leading edge of the paper 300 contacts the photoconductive element 314 as an imagewise exposing station, i.e., the leading edge of the paper 300 coincides with the leading edge of a toner image formed on the photoconductive element 314. As the leading edge of the paper 300 located in the vicinity of the cutter 308 is transported toward the photoconductive element 314 as far as the sensor 310, the record controller 332 (FIG. 7) starts counting synchronizing signals R.L. Sync in order to measure the length of the paper 300 being transported. The signals R.L. Sync are fed from the video controller 334 in response to the output signals of the beam position sensor 328 which is responsive to the scanning beam. As soon as the leading edge of the paper 300 reaches the register sensor 312, the record controller 332 delivers a signal D. Req to the first and second storing sections 2a and 2b for requesting the read-out of video data.

The first and second storing sections 2a and 2b are prearranged as to the data reading order, as previously stated. In response to the read request signal D. Req, the storage controller 206 of the first storing section 2a initializes the main and subscanning address supervising circuits 202 and 204 in synchronism with the synchronizing signal R.L. Sync and, at the same time, delivers a changeover signal W/R to cause the synchronizing signal switching circuit 208 to produce the synchronizing signal R.L. Sync from the image recording section 3. Further, the storage controller 206 conditions the storage 200 for a read mode and produces a gate signal R.F. Gate for reporting the start of video data read-out. At the same time, the storage controller 206 clears the flip-flop 210 and, in response to information entered on the inputting section 4, sets the selection signal of the selector 212 (FIG. 4). Concerning the selection signal, an input A is selected when a blank is to be formed at the leading edge of a paper and when an image is to be shifted to the trailing edge, while an input B is selected when a blank is to be formed at the trailing edge, when an image is to be shifted to the leading edge, and when no information is entered on the inputting section 4. Here, since it is assumed that no information has been entered as to the blank or shift, the selector 212 selects the $\bar{Q}$ output (high) of the cleared flip-flop 210 as the input B and, therefore, one input of the AND gate 214 has a high level.

Timed to the synchronizing signal R. L. Sync, the storage controller 206 produces a gate signal R. L. Gate for outputting the video data R. VD, while causing the main scanning address supervising circuit 202 to start incrementing the address. Then, the output of the AND gate 214 turns from low to high to cause the latch 216 into a video data output state. As a result, the video data R. VD are sequentially read out from the main scanning addresses #0 to #r of the subscanning address #0. In response to a synchronizing signal R. L. Sync, the subscanning address supervising circuit 204 increments the address while, at the same time, the main scanning address supervising circuit 202 is initialized. Again, the storage controller 206 produces a gate signal R. L. Gate for sequentially reading out the video data R. VD.

On receiving the video data read-out start signal R. F. Gate from the first storing section 2a, the video controller 334 of the image recording section 3 (FIG. 7) awaits the arrival of video data R. VD and gate signal R. L. Gate. When the video data and gate signal R. L. Gate arrive, the video controller 334 stores them in a toggle buffer memory (not shown). While the video controller 334 inputs the next gate signal R. L. Gate and video data R. VD in another toggle buffer memory, it reads the last video signal out of the preceding toggle buffer memory and, based on this video data, modulates the laser 320 in synchronism with the beam position signal to thereby form a latent image on the photoconductive element 314. The latent image is developed on the photoconductive element 314 and then transferred to the paper 300 by a conventional image forming process, the image on the paper 300 being fixed by the fixing roller pair 316a and 316b.

As soon as the trailing edge of the document 102 moves away from the sensor 114, the read controller 100 stops counting the CCD initializing signals (synchronizing signals) from the CCD driver 116. The read controller 100 sends the count to the system control section 5 either directly or after computing a document length on the basis of the document feed speed and the video data read-out density. After counting the period of time which the document 102 has needed to move from the sensor 114 to the slit 104, the read controller 100 stops delivering the read start signal WRITE. In response, the video data processor 120 stops receiving the video data from the CCD array 118 while stopping delivering the read start signal W. F. Gate and video data W. VD to the first and second storing sections 2a and 2b. The storage controller 206b of the second storing section 2b ends writing video data in the storage 200b when the read start signal W. F. Gate disappears.

The first storing section 2a continuously produces the gate signals R. L. Gate and video data R. VD timed to every synchronizing signal from the image recording section 3, thereby causing the subscanning address supervising circuit 204 to sequentially increment the subscanning address. When the subscanning address is incremented to the final address #n, the storing section 2a delivers a signal NEXT. 1 representative of the end of reading to the second storing section 2b, produces the video data stored in the main scanning addresses #0 to #r of the subscanning address #n together with gate signals R. L. Gate, and stops delivering the synchronizing signal R. L Sync on receiving the next synchronizing signal R. L Sync. In response to the end-of-read signal NEXT. 1, the storage controller 206b of the second storing section 2b initializes the main and subscanning address supervising circuits 202b and 204b in synchronism with the synchronizing signal R. L. Sync, and then starts incrementing the main scanning address supervising circuit 202b while delivering video signal stored in the subscanning address #0 and gate signal R. L. Gate. This sequence of steps is repeated thereafter.

The image recording section 3 continuously transports the paper 300, while the recording controller 332 continuously counts up the synchronizing signals R. L. Sync. When a value produced by subtracting a value associated with the distance between the cutter 308 and the sensor 310 from the count or from a length obtained from the count, the paper feed speed and the period of the synchronizing signals R. L. Sync by an arithmtic operation coincides with the data representative of the length of the document 102 and fed from the system control section 5, the cutter 308 is actuated to cut the paper 300 and, at the same time, the rotation of the roller pair 302a and 302b and therefore the pay-out of the paper 300 from the roll is stopped. The cut length of paper 300 is further transported by the roller pair 304a and 304b and, as soon as the trailing edge of this paper 300 move away from the register sensor 312, the delivery of the video data request signal D. Req is interrupted. Then, the second storing section 2b stops outputting the read start signal R. F. Gate in synchronism with the synchronizing signal R. L. Sync, thereby ending the video data reading operation. At this instant, the storing section 2b sends a signal NEXT. 2 to the first storing section 2a to inform the latter of the end of reading. In response to the disappearance of the read start signal R. F. Gate, the video controller 334 also stops receiving video data and, on receiving the next synchronizing signal R. L. Sync, modulates the laser 320 on the basis of the previously received video data being stored in the toggle buffer memory. The resulting latent image formed on the photoconductive element 314 is subjected to an image forming process, as stated earlier.

The procedure described above is shown in a timing chart in FIG. 11A.

When the subscanning address substantially reaches the predetermined value m while video data are written in the storage 200b of the second storing section 2b, the first storing section 2a starts reading video data out of its storage 200. This forms an image on a paper sheet, as shown in FIG. 10B.

Figure 11A:
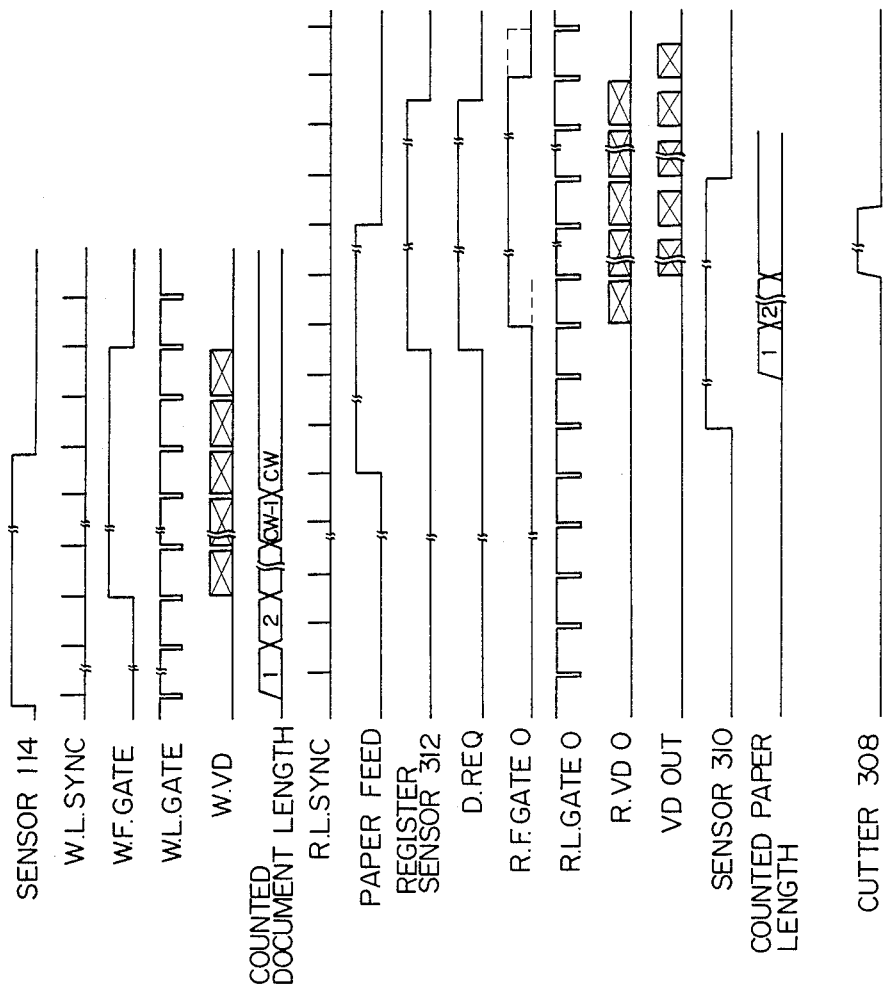
FIGS. 11A and 11B are timing charts representative of various signals.
Figure 11B:
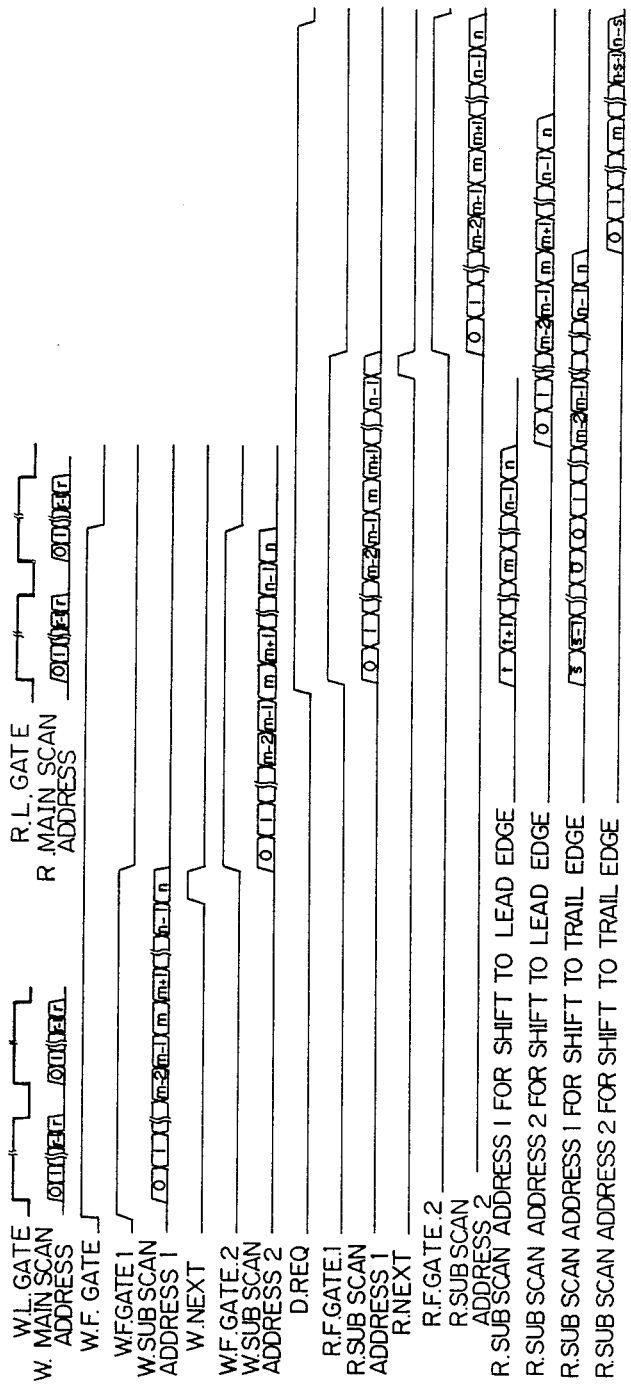

A procedure for shifting a document image toward the leading edge by a length t as shown in FIG. 10A so as to form an image on a paper as shown in FIG. 10C will be described with reference to FIG. 11B. As soon as the leading edge of the paper 300 reaches the register sensor 312, the recording controller 332 produces a video data request signal R. Req, as in the previously discussed ordinary recording mode. Then, in synchronism with a synchronizing signal R. L. Sync, the storage controller 206 of the first storing section 2a loads the subscanning address supervising circuit 204 with a value, or address, associated with the length t, i.e., a value obtained from the number of lines which one surface of the rotary scanning body scans, the image density in the subscanning direction, and the shifting length t by an arithmetic operation. The storage 200 is conditioned for a read mode, the synchronizing signal switching circuit 208 is connected to the synchronizing signal R. L. Sync, the flip-flop 210 is cleared, and the selector 212 is connected to the input B. In this condition, a gate signal R. L. Gate is outputted and, at the same time, the main scanning address supervising circuit 202 starts up-counting so that the video data are sequentially read out of the subscanning address #t. This is followed by the same sequence of steps as stated in relation to the ordinary recording mode, whereby an image is formed on the paper 300 as shown in FIG. 10C.

The document image may be shifted toward the leading edge by a length s to form an image on the paper 300 as shown in FIG. 10D, as follows. When the recording controller 332 produces a video data request signal D Req as the leading edge of the paper 300 reaches the register sensor 312, the storage controller 206 of the first storing section 2a loads the subscanning address supervising section 204 with an address which is a value ahead of the largest subscanning address of the storage 200 by a value associated with the length s, in synchronism with the synchronizing signal R. L. Sync. At the same time, the storage 200 is conditioned for a read mode, the synchronizing signal switching circuit 208 is connected to the synchronizing signal R. L. Sync, the flip-flop 210 is cleared, and the selector 212 is connected to the input A. Then, one input of the AND gate 214 turns from high to low and this low output is fed to the clear terminal of the latch 216, whereby the delivery of the video data is inhibited.

Subsequently, a gate signal R. L. Gate is produced and, at the same time, the main scanning address supervising circuit 200 starts up-counting. Assuming that the largest subscanning address of the storage 200 is n and the address associated with the length s is the address #s, the video data stored in the subscanning address #n—s are sequentially read out first. The subscanning address is sequentially incremented to #n—s+1, #n—s+2 and so forth. As the subscanning address #0 which immediately follows the address #n is reached, a pulse is fed to the flip-flop 210. This inverts the output of the flip-flop 210 and turns the input A from low to high. Subsequently, in response to a gate signal R. L. Gate, the latch 216 is brought into a video data output state. The main scanning address supervising circuit 202 starts up-counting in response to the gate signal R. L. Gate, whereby the delivery of video data R. VD begins. This is followed by the previously described operation so that an image is formed as shown in FIG. 10D.

The reading section 1 and image recording section 3 have been shown and described as individually counting the read-out and write-in line synchronizing signals in order to measure the lengths of the document 102 and paper 300. Alternatively, they may count signals which are divided to ⅛, 1/16 or the like if the accuracy requirement is not severe.

Figure 12A:
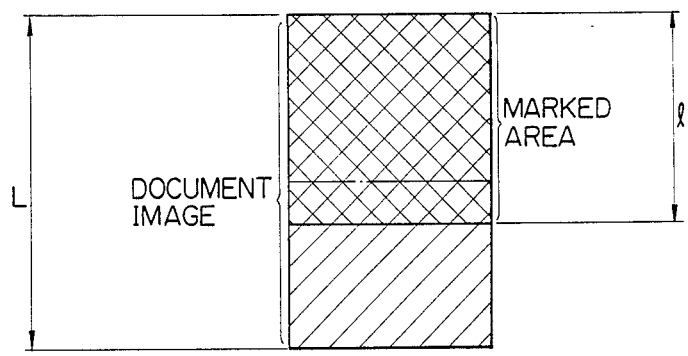
FIGS. 12A to 12C are diagrams demonstrating how a leading portion of image information on a document may be extracted.

Next, assume that information entered on the inputting section 4 commands the extraction of a leading portion of a document image, e.g., a command for extracting a document shown in FIG. 12A over a length l as measured from the leading edge of the document and reproducing such a marked image fragment. In this case, the system control section 5 feeds the width and the length l of a paper necessary for the image formation to the image recording section 3 and, at the same time, supplies the storage controllers 206 and 206b of the first and second storing sections 2a and 2b with a video data writing and reading order as well as the range of video data to be read out. Specifically, if the extracting length l is not greater than one block of storing section, the system control section 5 informs the first storing section 2a only, for example, of the range of video data which extends over the length l from the leading edge. If the length l is greater than one block of storing section, the system control section 5 prearranges the writing and reading order such that the first storing section 2a operates first and, then, it instructs the first storing section 2a to store all the video data from the leading edge while instructing the second storing section 2b to store the video data lying in the range produced by subtracting the extension of video data in the first storing section 2a from the length l.

Figure 12B:
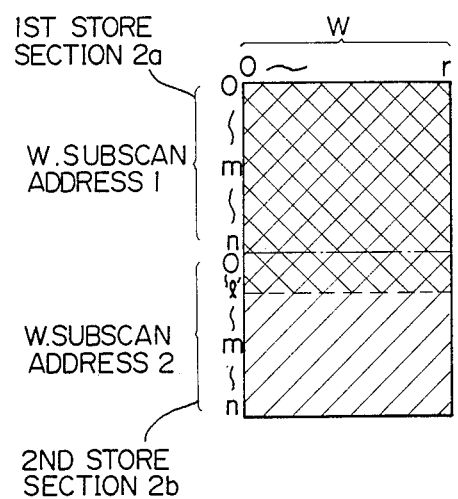

In the above condition, as the document 102 is inserted into the reading section 1, the video data are sequentially written in the first and second storing sections 2a and 2b by the previously stated procedure, as shown in FIG. 12B. In this example, all the video data representative of a document image are written in the first and second storing sections 2a and 2b. The writing of the video data in the storage 100b of the second storing section 2b may be ended after only the limited range of video data fed from the system control section 5 has been written. However, when it is desired to change the extracting range of video data once reproduced and then reproduce it again, all the video data associated with the whole document have to be written in the first and second storing sections 2a and 2b so that the the extracting range may be changed without the document 102 being read again.

Figure 12C:
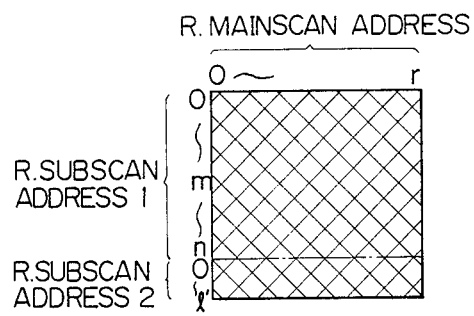

When the paper 300 fed after a predetermined delay relative to the insertion of the document 102 reaches the predetermined position as previously mentioned, the first and second storing sections 2a and 2b receive a video data request signal D. Req from the image recording section 3. In response, the first storing section 2a and then the second recording section 2b reads video data thereoutof and feeds them to the image recording section 3. The image recording section 3 feeds the paper 300 by the length l as commanded by the system control section 5 and then cuts it. On receiving the signal NEXT. 1 from the first storing section 2a, the second storing section 2b starts reading the video data in synchronism with a synchronizing signals L Sync and increments the address of the subscanning address supervising circuit 204b in response to the synchronizing signals L Sync. When the address of the supervising circuit 204b coincides with a value produced by subtracting 1 (one) from a value obtained from the particular length fed from system control section 5 and the pixel density (e.g. l' shown in FIG. 12C because the address starts at #0), the read-out of video data is stopped. Such a procedure allows the image recording section 3 to receive video data associated with the extracting length l, develop the resulting image, and produce a copy by a predetermined sequence of steps.

The image recording section 3 involves some irregularities as to the paper transporting and cutting operations due to slippage and so forth. This brings about a problem when the length of video data and that of the paper 300 are implemented by the independent storing sections 2a and 2b as discussed earlier. Specifically, if the length of the paper 300 is short of an adequate length due to the irregularities, a latent image will be formed in that part of the photoconductive element which misses the trailing edge portion of the paper 300, resulting in the entire toner image in such a part being collected in a cleaning unit which is located in close proximity to the photoconductive element. In the light of this, the length of the paper 300 may be selected to be sufficiently long to accommodate the irregularities.

In an alternative embodiment of the present invention, the system control section 5 feeds a width and a length of a paper necessary for image formation to the image recording section 3, while the reading of a document image after the insertion of a document and the writing and reading of video data are performed in the same manner as discussed above. After the image recording section 3 has cut a predetermined length paper, the video data request signal D. Req is interrupted to in turn interrupt the read-out of video data. Again, the cut length of paper may be sufficiently long to accommodate the irregularities as mentioned earlier.

Figure 13A:
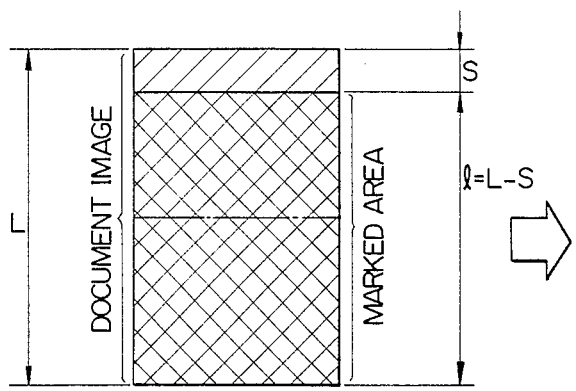
FIGS. 13A to 13B are diagrams demonstrating how a trailing portion of image information on a document may be extracted.

Assume that the information entered on the inputting section 4 commands the extraction of a trailing part of a document image, e.g., a document image except for a length s as measured from the leading edge, as shown in FIG. 13A. Then, the system control section 5 informs the image recording section 3 of the width of paper necessary for image formation while informing the reading section 1 of the length s to be omitted. Further, the system control section 5 instructs the first and second storing sections 2a and 2b which of them should start writing and reading video data first. It is assumed that, when the system control section 5 does not deliver any information as to the writing or reading range of video data to the storing sections 2a and 2b, the storing sections start writing video data W. VD in the individual storages 200 and 200b at the address #0 in response to a read start signal W.F. Gate from the reading section 1, and start reading video data R. VD out of the storages 200 and 200b at the address #0 in response to a video data request signal D. Req. from the image recording section 3. Such writing and reading operations each ends when the associated signal disappears.

First, as the document 102 is inserted into the reading section 1, it is driven by the feed roller pair 106a and 106b toward the slit 104 to reach the sensor 114. Receiving the resulting output of the sensor 114, the read controller 100 counts the time which the document 102 needs to travel from the sensor 114 to the slit 104 and the time necessary for transporting the document 102 by the length s which is fed from the system control section 5, thereupon outputting a read start signal WRITE. In response to this signal WRITE, the video data processor 120 sequentially receives video data associated with the main scanning direction of the CCD array 118, in synchronism with the initializing signals SH which are fed from the CCD driver 116 to the CCD array 118. The video data processor 120 sequentially produces video data W. VD by processing the video data on the basis of the synchronizing signal W. L. Sync, gate signal W. L. Gate associated with video data in the main scanning direction, read start signal W. F. Gate, and output of the inputting section 4. The read controller 100 starts counting the initializing signals SH on receiving the output of the sensor 114 and, then, stops counting them on receiving an output of the sensor 114 which appears when the trailing edge of the document 102 moves away from the sensor 114. The read controller 100 sends the count itself or the length of read video data obtained from the count and the reading density by an arithmetic operation to the system control section 5.

Figure 13B:
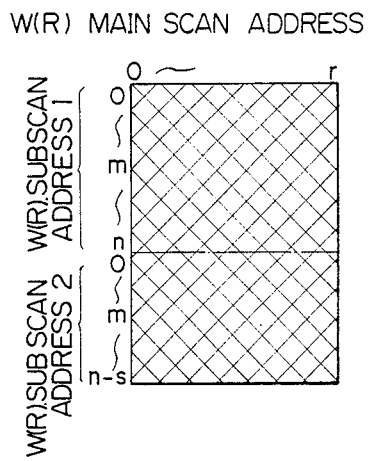

Each of the first and second storing sections 2a and 2b starts writing video data in their associated storage 200 or 200b in response to a read start signal W. F. Gate from the reading section 1, and ends the writing operation when the signal W. F. Gate disappears. Consequently, video signals are stored in the storing sections 2a and 2b, as shown in FIG. 13B. By the same operation as discussed earlier, the image recording section 3 starts paying out the paper 300 from the roll at a predetermined timing in response to a read start signal WRITE which is fed from the reading section 1. As the leading edge of the paper 300 reaches sensor 310, the image recording section 3 starts measuring the length of the paper 300. When the leading edge of the paper 300 arrives at the register sensor 312, the image recording section 3 delivers a video data request signal D. Req to the storing sections 2a and 2b. Then, the storing sections 2a and 2b sequentially read video data R. VD out of the address being first. Thereafter, as the length of the paper 200 being transported coincides with a value produced by subtracting the distance between the cutter 308 and the sensor 310 from the length data which is fed from the system control section 5 (i.e. length l which the reading section 1 has sent to the system control section 5 at the end the video data reading operation), the image recording section 3 cuts the paper 300. When the trailing edge of the cut length of paper 300 reaches the register sensor 312, the image recording section 3 stops delivering the video data request signal D. Req. This is followed by the same sequence of image forming steps as previously described to produce a copy. As a result, video data are recorded as shown in FIG. 13B. A shortcoming with this kind of procedure is that since video data associated with the leading edge portion s of the document image are not stored in any of the first and second storing sections 2a and 2b, the extracting range cannot always be changed as desired. An alternative embodiment which will be described is successful in eliminating this shortcoming.

Figure 13C:
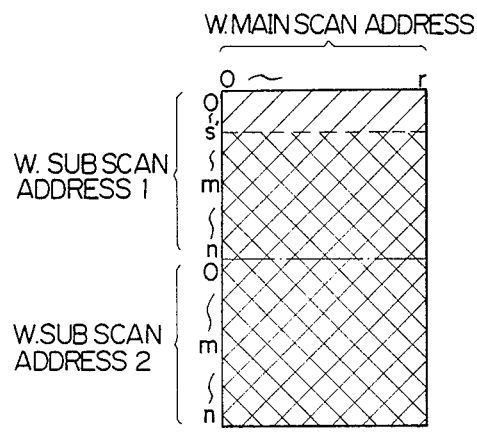
Figure 13D:
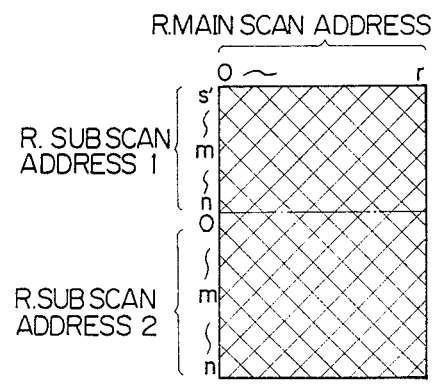

Specifically, the system control section 5 informs the image recording section 3 of a width of a paper necessary for image formation while informing the storages 206 and 206b of the length s, as measured from the leading edge of a document image, over which the document image is to be omitted. The reading section 1 reads a document image in substantially the same manner as previously discussed. Namely, the reading section 1 starts reading a document at the leading edge of the latter so that video data representative of the entire document image are written in the first and second storing sections 2a and 2b, as shown in FIG. 13C. Again, a video data request signal D. Req is produced by the image recording section 3 when the leading edge of the paper 300 being paid out from the roll arrives at the register sensor 312. After the video data request signal D. Req has been applied to the first storing section 2a, the storing section 2a starts reading out the video data at the address s which is provided by incrementing the initial value of the subscanning address supervising circuit 204 by a value associated with the length s. As a result, video data shown in FIG. 13D are fed to the recording section 3 to be recorded on the paper 300.

Figure 13E:
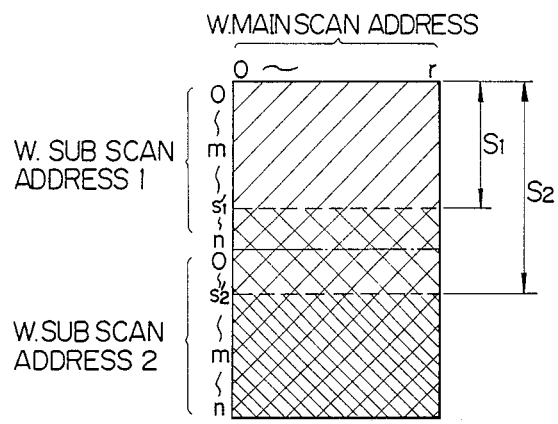
Figure 13F:
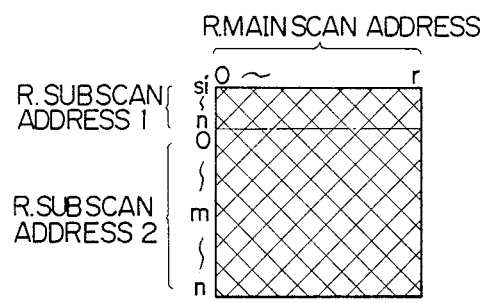
Figure 13G:
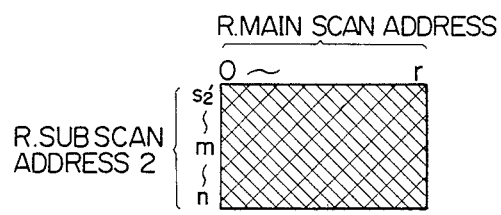

In the illustrative embodiment, to prevent overlapping access to the same storing section for writing and reading while enhancing the copy processing ability, the sequence of steps from the insertion of a document to the start of feed of the paper 300 occur at such timings that at the time when the first storing section 2a starts reading out video data in response to a video data request signal D. Req which appears on the arrival of the leading edge of the paper 300 at the register sensor 312, the video data from the reading section 1 have already been written in the second storing section 2b substantially up to the intermediate point (m, FIGS. 13A to 13G) of the latter. This is not satisfactory, however, when it is desired to omit a leading edge portion of a document image over a substantial length. Specifically, assuming that the leading edge portion to be omitted extends over a length $s_1$ as shown in FIG. 13E, the distance between the subscanning address $s'_1$ of the first storing section 2a where video data beings to be read out in response to a video data request signal D. Req and the subscanning address n of the same storing section 2a is shorter than the distance between the subscanning address m of the second storing section 2b and the subscanning address n of the same storing section 2b. In this condition, when the second storing section 2b is to start reading out the video data in response to the signal NEXT immediately after the first storing section 2a has fully read out the video data to the subscanning address n thereof, the storing section 2b is continuously writing incoming video data therein, resulting in overlapping access. In the worst case, the overlapping access occurs at the beginning of read-out such as when the omitting length of a document image is $s_2$, as shown in FIG. 13E. To eliminate this occurrence, it is necessary that the paper 300 be paid out from the roll at a particular which, after all the video data from the reading section 1 have been written in the first and second storing sections 2a and 2b, causes the leading edge of the paper 300 to reach the register sensor 312 to cause a video data request signal D. Req to appear.

In summary, it will be seen that the present invention provides an image recorder which allows only a marked area of a document to be reproduced on a paper of particular size which matches with the marked area and, therefore, without a wasteful blank area being produced on the reproduction. Further, when a plurality of reproductions are to be produced with a single document, the image recorder eliminates an extra period of time otherwise needed to transfer each paper over the blank area and thereby enhances efficient processing.

Various modifications will become possible for those skilled in the art after receiving the teachings of the present disclosure without departing from the scope thereof.

What is claimed is:

1. An image recorder having an image editing function for recording on a paper only a marked area of image information which is printed on a document, comprising:
    reading means for reading the image information on the document;
    storing means for storing data, which is the read image information in the form of video data;
    recording means for reproducing the stored video data on a paper by reading said video data out of said storing means;
    inputting means for marking a particular area of the image information to be recorded on the paper; and
    control means for controlling said reading means, said storing means, said recording means and said inputting means such that the image information in the marked area of the document is recorded on a paper which has at least a length which is associated with said marked area and wherein said length is determined in response to said marked area.

2. An image recorder as claimed in claim 1, wherein said reading means comprises photoelectric transducer means for digitally reading the image information on the document by photoelectrically converting said image information, and video data processor means for applying various kinds of image processing to digital video data being outputted by said photoelectric transducer means.

3. An image recorder as claimed in claim 1, wherein said storing means comprises a main scanning address supervising circuit for supervising addresses with respect to a main scanning direction, a subscanning address supervising circuit for supervising addresses with respect to a subscanning direction, storages each being supervised by respective one of said main and subscanning address supervising circuits with respect to the addresses, control circuits each controlling write-in and read-out of the video data of respective one of said storages and controlling switchover of synchronizing signals, and synchronizing signal switching circuits each for switching over the synchronizing signals.

4. An image recorder as claimed in claim 1, wherein the paper comprises a roll of paper.

5. An image recorder as claimed in claim 4, wherein said recording means comprises cutting means for cutting a predetermined length of the paper which is paid out from the roll.

6. An image recorder having an image editing function for recording on a roll of paper only a marked area of image information which is printed on a document, said image recorder comprising:
    reading means for reading the image information on the document;
    storing means for storing data, which is the read image information in the form of video data;
    recording means for reproducing the stored video data on a paper by reading said video data out of said storing means;
    inputting means for marking a particular area of the image information to be recorded on the roll of paper;
    cutting means for cutting the roll of paper to have a predetermined length which is determined in response to said marked area; and
    control means for controlling said reading means, said storing means, said recording means, said inputting means and said cutting means such that the image information in the marked area of the document is recorded on a cut paper having said predetermined length.

* * * * *